United States Patent [19]

Tuttle

[11] 4,346,588
[45] Aug. 31, 1982

[54] REPRODUCING SURFACE TESTING METHOD AND APPARATUS

[76] Inventor: Douglas E. Tuttle, 1000 Mary Allen La., Mountainside, N.J. 07092

[21] Appl. No.: 218,341

[22] Filed: Dec. 22, 1980

[51] Int. Cl.³ .............................................. G01B 5/28
[52] U.S. Cl. ...................................................... 73/105
[58] Field of Search .................................. 73/105, 104

[56] References Cited

U.S. PATENT DOCUMENTS

| | | | |
|---|---|---|---|
| 2,601,703 | 7/1952 | Sawyer | 73/104 |
| 2,667,070 | 1/1954 | Sockman et al. | 73/104 |
| 3,862,047 | 1/1975 | Weltman | 73/104 |
| 3,995,483 | 12/1976 | Hartong | 73/104 |

*Primary Examiner*—S. Clement Swisher
*Attorney, Agent, or Firm*—Howard C. Miskin

[57] ABSTRACT

The cell depth of a printing or similar ink applicator roller or the like is determined by cleaning a small area of the roll surface, hinging to the surface proximate the cleaned area by means of a pressure sensitive adhesive tape a rectangular polyester film mount with a coated matte underface, to which the resin used will permanently adhere when cured, applying a small amount of a liquid photo-polymer resin to a section of the cleaned area, folding the mount over the areas, squeegeeing the tape outerface with a straight-edge spatula to fill the cells with the resin to the level of the roll surface then securing the outer border of the mount to the roll surface by a pressure-sensitive tape exposing the resin to ultra-violet radiation to cure the resin to a solid somewhat flexible rigid state adherent to the mount, removing the mount and measuring the thicknesses of the uncoated and coated areas of the mount and calculating their difference as an indication of the cell condition and/or depth of the roll surface.

9 Claims, 7 Drawing Figures

REPRODUCING SURFACE TESTING METHOD AND APPARATUS

BACKGROUND OF THE INVENTION

The present invention relates generally to improvements in measuring and testing methods and equipment and relates particularly to an improved method and apparatus for determining the cell depth or condition of the surface of a printing, embossing or ink-metering roll having a surface provided with recesses or cells.

In many image-producing devices such as for printing on paper films, foils, fabrics and other webs there are employed rolls provided with cells or small recesses corresponding to the desired density or image, such rolls including flexo anilox rolls, machine engraved, roto-gravure coating, printing and applicator rolls, embossing rolls and the like. The effectiveness and condition of these ink metering and/or imaging rolls depends on the condition of the engraved roll surface which in turn depends on the depth of recesses or cells. As the roll surface cells or recesses diminish in depth below a predetermined value the quality, resolution and faithfulness of the reproduction produced by the roll is reduced until it is at an inferior and unacceptable level and the roll surface is no longer satisfactory. If the roll is employed after this unsatisfactory condition is reached the resulting product is of inferior quality and of less or no value. It is accordingly highly undesirable to employ printing, embossing and similar rolls after the recess or cell depth has reached a predetermined minimum value and in order to avoid this occurance it is highly desirable to determine the roll surface cell depth and hence the condition of this surface for further use and the available further usefulness thereof in producing acceptable reproduction.

SUMMARY OF THE INVENTION

It is a principal object of the present invention to provide an improved testing and measuring method and apparatus.

Another object of the present invention is to provide an improved method and apparatus for determining the condition and quality of the surfaces of reproducing plates or rolls such as new or worn flexo anilox rolls, machine-engraved, rotogravure coating, printing and applicator rolls, embossing rolls and the like.

Still another object of the present invention is to provide an improved method and apparatus for determining the depth of the cells or recesses in the work surfaces of ink, coating or adhesive metering or reproducing devices such as flexo anilox rolls, printing and applicator rolls, embossing rolls and the like as a measurement of the quality and wear of such surfaces.

A further object of the present invention is to provide an improved method and apparatus of the above nature characterized by their reliability, simplicity, low cost, ease and speed of application and great versatility and adaptability.

The obove and other objects of the present invention will become apparent from a reading of the following description taken in conjunction with the accompanying drawings which illustrate a preferred embodiment thereof.

The above objects are achieved by the improved method in accordance with the present invention which includes the steps of applying to a small area of a recessed reproducing area a solidifiable resin in a fluid state to fill the recesses in the area, superimposing on the area a non-fibrous flexible sheet mount which is adherent to the resin, solidifying the resin, separating the mount with the adherent resin from the reproducing surface and determining the thickness of the adherent resin layer as an indication of the recess depth and hence the condition of the reproducing surface.

In the preferred method the resin is a photo-polymer resin in a liquid incurred state and the mount is a rectangular panel of coated 1-sider polyester film. The film panel is first hinged to the reproducing surface, which may be the peripheral surface of a reproducing roll, by means of a pressure sensitive adhesive tape, the liquid resin is brushed onto an area of the reproducing surface underlying the film panel, the panel is then folded over the area and then squeegeed to assure the filling of the recesses by the liquid resins and the levelling of the resin to the face of the reproducing surface. The panel is then secured in position by means of pressure-sensitive adhesive tape and the resin in then cured by exposing it to ultraviolet radiation. The resin-carrying panel is then separated from the reproducing surface and the thicknesses of the resin-coated and uncoated areas of the panel are measured by a thickness gauge.

The improved method is reliable, accurate, easy, economical and of great versatility and adaptability and requires for its practice and inexpensive and simple kit.

DESCRIPTION OF THE PREFERRED EMBODIMENT

Figure 1:
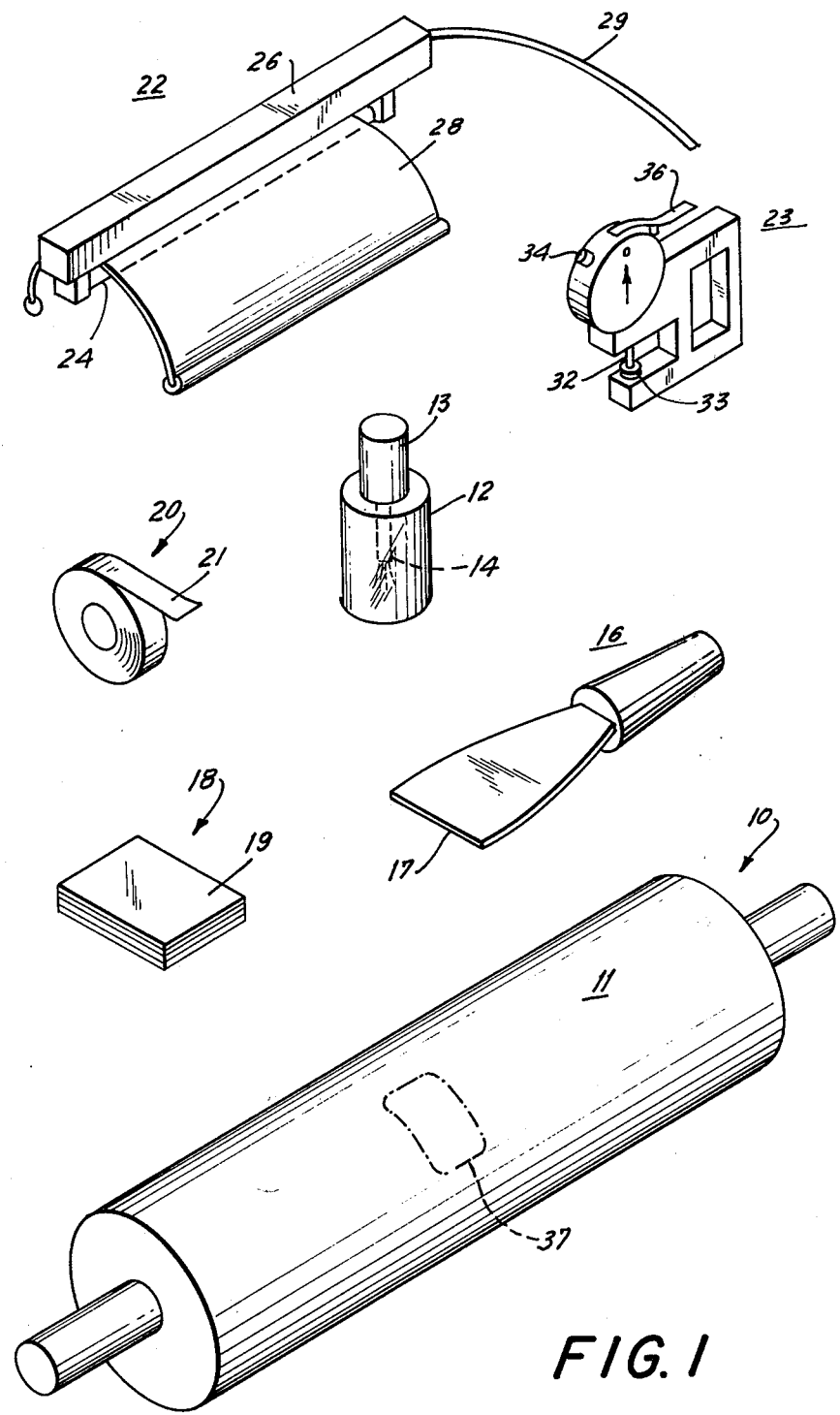
FIG. 1 is a perspective view of the components of an improved kit for practicing the method in accordance with a preferred embodiment of the present invention and of a reproducing cylinder to which the method is applied.

Referring now to the drawings which illustrate a preferred embodiment of the present invention the reference numeral 10 generally designates a printing roll or conventional construction having a recessed or celled reproducing or printing surface 11 to which the present method is applied it being understood that it may be applied to other printing or reproducing surfaces such as flexo anilox rolls, machine-engraved or acid-etched rotogravure coating, printing and applicator rolls, embosssing rolls and the like. The kit for practicing the improved method comprises an opque or dark bottle 12 closed by a screw cap 13 carrying an applicator brush 14 and containing a photo-polymer resin in an uncured liquid state. The liquid resin is of the type which is cured and solidified to a more or less flexible state in a short period, for example from about one to five minutes, when exposed to ultraviolet radiation of suitable wave-length and intensity. An example of a suitable photo-polymer resin is sold by Hercules, Inc. of Wilmington Delaware under its trademark "MERIGRAPH" for use in the Hercules system of producing photo-polymer flexographic printing plates, although other known photo-polymer or otherwise curable liquid resins may be employed.

Additionally the kit includes a pressure applicator or squeegee device such as a flexible blade spatula 16 having an end straight edge 17, a supply 18 of mounts 19 of flexible film such as a polyester film, for example TM Mylar, having at least one coated matte surface, a roll 20 of transparent pressure sensitive tape 21, an ultraviolet curing source 22 and a hand-held thickness gauge 23. The mounts 19 are advantageously rectangular, for example of about 2 inches by 3 inches and are of uniform thickness and their coated (matte) surface is comaptable with and adherent to the photo-polymer resin, it being understood that other suitable polymeric films may be employed. The ultraviolet source 22 is of known construction and includes a linear ultraviolet generating gas discharge lamp 24 carried by a socket-provided barcket 26 housing the associated electrical components and connected to an AC power supply by a power cord 27, the lamp 24 being backed by a parabolic cylindrical reflector 28 carried by bracket 26 terminating at its outer edges by soft flexible gasket strips 29. The thickness gauge is of conventional construction and includes a movable sensing plunger or contact 32 and a base block or stationary contact 33, the confronting faces of the contacts being flat and transverse, a dial release knob 34 permitting the release and rotation of the dial face for zeroing adjustment and a plunger raising lever 36.

Figure 2:
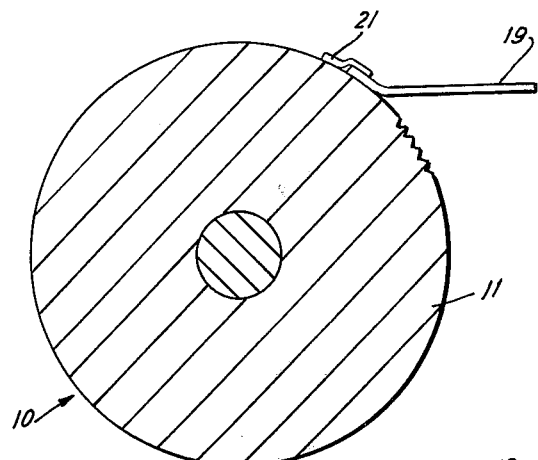
FIGS. 2 to 6 are similar transverse sectional views of the reproducing cylinder showing successive steps in accordance with the present method.

Considering now the application of the improved method with the kit described above to the engraved metering or pattern printing roll 10, an area 37 of the roll surface 11, for example about 3 inches by 6 inches is throughly cleaned and dried. A film panel 19 is centered on area 37 and is hinged, secured along a short edge thereof by a length of pressure sensitive adhesive tape 21 to roll surface 11 with the matte face of the mount 19 engaging and confronting the roll surface 11 and the opposite smooth face of mount 19 exposed, as seen in FIG. 2.

Figure 3:
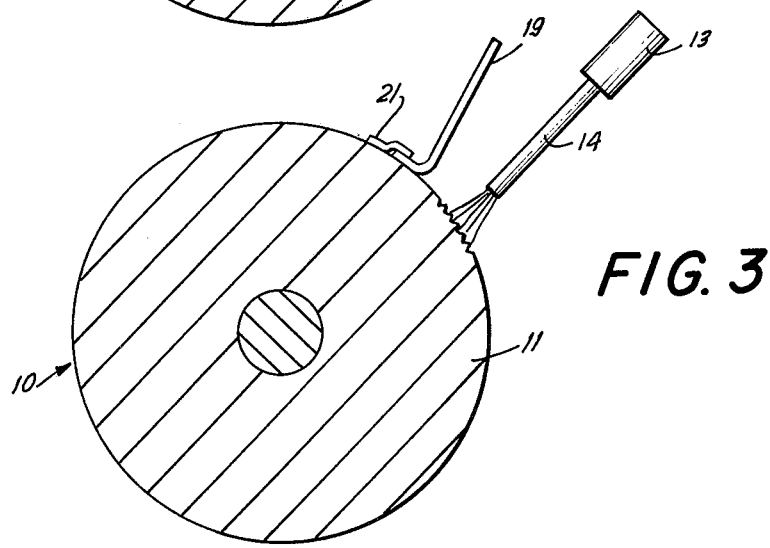
Figure 4:
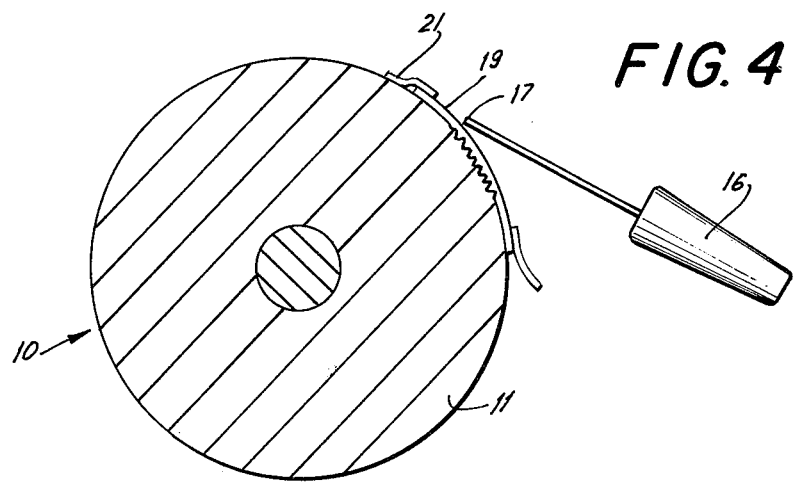

The mount 19 is then swung or folded back about the tape defining hinge and a drop or two of the liquid resin is applied to a central section of the cleaned area 37 of the engraved surface 11 with the applicator brush 14, as seen in FIG. 3, the test section to which the resin is applied being about advantageously between about ¼ inch and ½ inch square. The liquid resin is carefully brushed into contact with the engraved surface and enough resin is applied to completely fill the cells or recesses in the test section and provide a slight excess surface coverage. After all the bubbles have dissipated from the resin in the test section the mount 19 is swung about its hinged edge to overlie the resin covered test section and the surface of cleaned area 37 bordering the test section. The straight end edge 17 of the blade of the hand held spatula 16 is then applied to the outside or top smooth surface of the mount 19 and while maintaining a steady uniform pressure against the exposed surface of the mount and the resinfilled test area, the straight edge 17 is slowly advanced toward the untaped free end of mount 19 to insure that the liquid resin completely fills the cells flush with the tops of the lands in the test area, as seen in FIG. 4.

Figure 5:
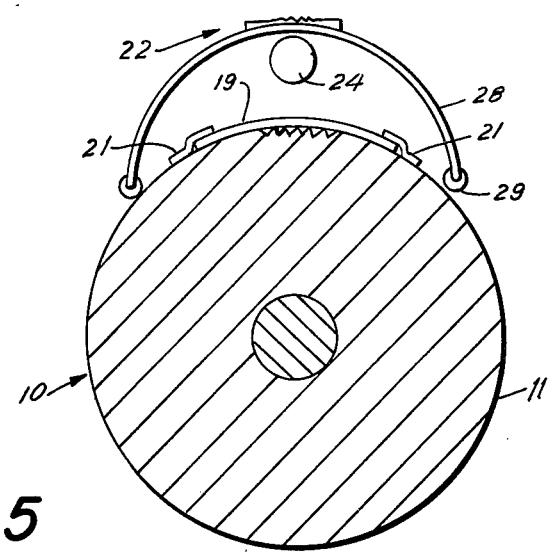
Figure 6:
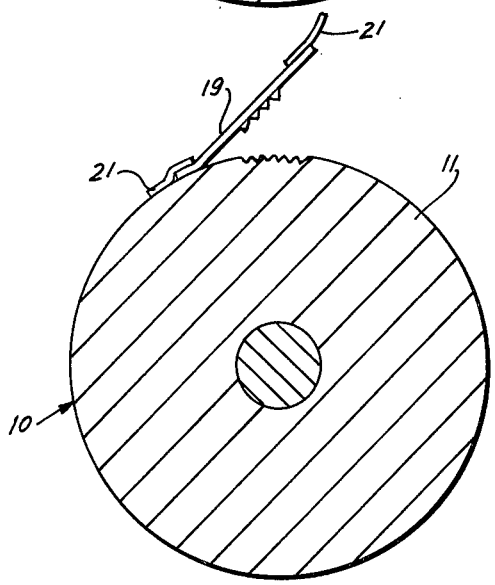
Figure 7:
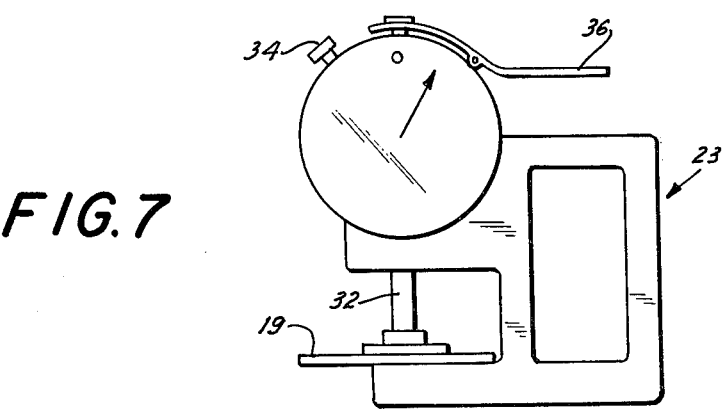
FIG. 7 is a front elevational view of a thickness gauge shown measuring the thickness of the resin-coated film panel in accordance with a latter step of the method.

When the mount 19 has been securely fixed at both ends by pressure sensitive tape 21 to roll surface 11 superimposed over the resin carrying test section, the roll 10 is rotated, if necessary to position the mount-covered test section at the top, and ultraviolet source curing unit 22 is centered over the test section, as shown in FIG. 5 and the cord 27 is coupled to an AC outlet to energize the ultraviolet lamp 24 and expose the liquid resin to ultraviolet radiation through the polyester film panel 19. After the resin has been cured and solidified under the influence of the ultraviolet radiation, the curing unit 22 is removed from the roll 10 and unplugged. The normal curing cycle is about one to five minutes depending on the resin used. The mount 19 is then separated from the roll surface 11 and carries the cured solidified resin which is in the form of an essentially rigid, solid but slightly flexible transparent plastic impression firmly adhering to the coated matte surface of the mount 19 as the mount is peeled from the roll surface 11 as shown in FIG. 6.

The thickness of the cured resin impression carried by mount 19, which thickness is equal to the depth of the cells in reprodused surface 11, is then measured by the hand-held thickness gauge 23. To this end the gauge indicator needle is accurately adjusted to the dial zero reading by loosening knob 34 and carefully rotating the rim of the dial until the needle and the dial zero calibration are in precise registry and thereafter locking the dial by tightening knob 34. The gauge contact plunger 32 is retracted by actuating the finger-operated lever 36, thereby separating the contacts 32 and 33 to permit the insertion of the resin-carrying mount 19. The lifting lever is then released to permit the constant pressure advance of the plunger and the sandwiching of a contacts 32 and 33, the needle pointing to a dial calibration indicating the thickness of the area embraced by the closed contacts 32 and 33. Employing the above procedure a plurality of measurements are obtained of the thickness of different parts of the resin-coated area of mount 19 and of different parts of the uncoated area of the mount bordering the coated area. The average of the thicknesses of the coated area and the average of the thickness of the of the unocated area are obtained and their difference determined. The thickness difference thus determined is equal to the thickness of the cured plastic impression or layer and is in turn equal to the cell depth in the test aarea of the roll surface 11.

With a thickness gauge 23 having a dial calibrated in 0.0001 inch division, thickness readings down to about one fifth of a tenthousandth of an inch (0.00002) are achievable to thereby provide a precise fine measurement of the cell depth in the roll reproducing surface and hence a close indication of the condition and wear of reproducing surface.

While there has been described and illustrated a preferred embodiment of the present invention it is apparent that numerous alterations, omissions and additions may be made without departing from the spirit thereof. For example, while an ultra-violet radiation curable liquid resin is employed to great advantage, liquid resins which are solidifiable upon being subjected to other radiation may be used and such radiation employed in curing or solidifying the resin. Moreover in addition to the measurement of the impression described by use of the hand-held thickness gauge, the permanent impression may be further examined and photographed by using any of various available magnifying scopes, metallographs etc. When and if it is desirable to accurately examine and analyze the surface condition, configuration etc. of the impression and hence the surface from which the impression was made.

I claim:

1. The method of measuring the condition and volume of a recessed reproducing surface comprising the steps of applying a fluid resin to an area of said reproducing surface to substantially fill the recesses within said areas, superimposing on and beyond said area a non-fibrous transparent flexible sheet adherent to said resin, solidifying said resin to form a solid impression, separating said sheet from said surface with said resin impression adherent thereto and determining the thickness of said resin impression adherent to said sheet as an indication of the condition of said printing surface.

2. The method of claim 1 wherein said impression thickness is determined by measuring the thickness of said sheet and superimposed resin impression and the thickness of the sheet alone and calculating the difference therebetween.

3. The method of claim 1 wherein said fluid resin is in at least a partly uncured state and is solidified while covered by said sheet by subjecting it to a curing influence.

4. The method of claim 1 wherein said resin comprise a photo-polymer resin in at least a partly uncured state and is solidified while covered by said sheet by exposing said resin to ultra-violet radiation.

5. The method of claim 1 wherein said sheet is a flexible polyester film.

6. The method of claim 1 wherein said sheet is releasably retained on said surface superimposed on said resin-filled recessed area by pressure sensitive adhesive tape.

7. The method of claim 1 including the step of squeegeeing said sheet while superimposed on said area before the solidification of said resin to assure the filling of the recesses in said area by the fluid resin to the level of said metering or printing surface.

8. The method of claim 1 wherein said sheet is hinged to said surface by a pressure-sensitive tape prior to the application of said fluid resin and is then folded over the resin-carrying area.

9. The method of claim 1 wherein said sheet has a coated matte-finished surface which overlies said resin-carrying area.

* * * * *